(12) United States Patent
Goosman

(10) Patent No.: US 7,319,666 B2
(45) Date of Patent: Jan. 15, 2008

(54) METHOD AND APPARATUS FOR CONCATENATING AND PIGGYBACKING DATA PACKETS

(75) Inventor: Todd Foster Goosman, Indianapolis, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 1052 days.

(21) Appl. No.: 10/339,616

(22) Filed: Jan. 9, 2003

(65) Prior Publication Data

US 2003/0147411 A1 Aug. 7, 2003

Related U.S. Application Data

(60) Provisional application No. 60/355,637, filed on Feb. 6, 2002.

(51) Int. Cl.
  *H04L 12/56* (2006.01)
  *H04L 12/28* (2006.01)
(52) U.S. Cl. ............... 370/230; 370/235; 370/392; 370/428
(58) Field of Classification Search ............ None
  See application file for complete search history.

(56) References Cited

U.S. PATENT DOCUMENTS

| | | | | |
|---|---|---|---|---|
| 6,041,051 A | 3/2000 | Doshi et al. | ........... | 370/352 |
| 6,055,242 A | 4/2000 | Doshi et al. | ........... | 370/458 |
| 6,178,405 B1 | 1/2001 | Ouyang et al. | ........... | 704/500 |
| 6,208,275 B1 | 3/2001 | Lovell | ........... | 341/100 |
| 6,349,138 B1 | 2/2002 | Doshi et al. | ........... | 380/200 |
| 6,438,123 B1 | 8/2002 | Chapman | ........... | 370/351 |
| 6,466,651 B1 | 10/2002 | Dailey | ........... | 379/37 |
| 6,690,645 B1 * | 2/2004 | Aweya et al. | ........... | 370/230 |
| 6,721,796 B1 * | 4/2004 | Wong | ........... | 709/232 |
| 6,779,050 B2 * | 8/2004 | Horton et al. | ........... | 710/30 |
| 7,106,723 B2 * | 9/2006 | Rabenko | ........... | 370/352 |
| 7,203,164 B2 * | 4/2007 | Gummalla et al. | ........... | 370/230 |
| 2001/0053152 A1 | 12/2001 | Sala et al. | ........... | 370/412 |
| 2002/0064169 A1 | 5/2002 | Gummalla et al. | ........... | 370/412 |

OTHER PUBLICATIONS

PCT Search Report dated: Aug. 8, 2003.

* cited by examiner

*Primary Examiner*—Chi Pham
*Assistant Examiner*—Soon D. Hyun
(74) *Attorney, Agent, or Firm*—Joseph J. Laks; Paul P. Kiel; Guy H. Eriksen

(57) ABSTRACT

A method and apparatus for concatenating and piggybacking data packets in a bi-directional communication device include, in response to a first transmission queue of the bi-directional communication device containing less than a threshold number of data packets, transferring a data packet from a second transmission queue in the bi-directional communication device to the first transmission queue, the transferred data packet comprising at least two concatenated data packets. The method and apparatus further include identifying the transferred data packet as a ready-to-send data packet in the first transmission queue after the transfer, and indicating the presence of a subsequent ready-to-send data packet in a primary ready-to-send data packet, the primary ready-to-send data packet and the subsequent ready-to-send data packet existing in a sequence of ready-to-send data packets in the first transmission queue.

19 Claims, 3 Drawing Sheets

METHOD AND APPARATUS FOR CONCATENATING AND PIGGYBACKING DATA PACKETS

CROSS-REFERENCE TO RELATED APPLICATIONS

This patent application claims the benefit of U.S. provisional application Ser. No. 60/355,637, filed Feb. 6, 2002, which is incorporated herein by reference in its entirety.

FIELD OF THE INVENTION

This invention relates to the field of bi-directional communication systems and, more specifically, to the concatenation and piggybacking of data packets in bi-directional communication systems.

BACKGROUND OF THE INVENTION

Packet networks such as the Internet provide an effective vehicle for worldwide data and audio communication at a cost much lower than Public Switched Telephone Networks (PSTNs). As such, there is an increasing demand for expanding the capabilities of communication via the Internet. There are, though, several limitations to existing technology that inhibit this goal.

In an effort to increase the rate of data transmission in bandwidth limited bi-directional communication systems, concatenation is used to reduce the number of requests for bandwidth to a Cable Modem Termination System (CMTS).

Concatenation is a method described in the Docsis 1.0/1.1 RFI specification, which allows more efficient transmission of data packets in the upstream direction (i.e., from a modem to a CMTS or headend) by combining a number of single data packets into one concatenated data packet. In one example using concatenation, a DOCSIS cable modem makes only one bandwidth request for multiple data packets (in the form of one concatenated data packet), as opposed to making a different bandwidth request for each data packet. Although Docsis 1.0/1.1 RFI specification describes the protocol to implement concatenation, it does not state how and when it should occur, or how best to optimize the use of concatenation. One shortcoming is that concatenation is typically implemented by waiting until a requisite number of data packets to be transmitted upstream to the CMTS are queued at the cable modem (CM), and it is generally not known when the next data packet for upstream transmission will arrive at the CM queue. This can result in unknown transmission delays.

A second method called "piggybacking" is also described in the Docsis 1.0/1.1 RFI specification, which allows more efficient use of upstream bandwidth. In order to implement piggybacking, a requisite number of data packets must be queued at the packet descriptor queue of the CM IC. Given this condition, the CM IC will automatically cause a $1^{st}$ data packet to generate a piggyback request for a $2^{nd}$ data packet. Similarly, if a $3^{rd}$ data packet is present when the $2^{nd}$ data packet is ready to be sent, a piggyback request for the $3^{rd}$ data packet will be generated by the CM when the $2^{nd}$ data packet is sent. This piggyback operation continues as long as there are data packets waiting to be sent with their ownership bits set in the data packet descriptor queue. Current piggyback methods though, can only transmit the available data packets one at a time.

SUMMARY OF THE INVENTION

The subject invention provides a method and apparatus for advantageously combining the concatenation and piggybacking of data packets in bi-directional communication systems to reduce processing time and increase the rate of data transmission.

In one embodiment of the present invention a method includes, in response to a first transmission queue of the bi-directional communication device containing less than a threshold number of data packets, transferring a data packet from a second transmission queue in the bi-directional communication device to the first transmission queue, the transferred data packet comprising at least two concatenated data packets. The method further includes identifying the transferred data packet as a ready-to-send data packet in the first transmission queue after the transfer, and indicating the presence of a subsequent ready-to-send data packet in a primary ready-to-send data packet, the primary ready-to-send data packet and the subsequent ready-to-send data packet existing in a sequence of ready-to-send data packets in the first transmission queue.

In another embodiment of the present invention an apparatus includes a first transmission queue, for storing data packets and a first set of instructions, a second transmission queue for storing data packets over a predetermined threshold number of the data packets to be stored in the first transmission queue and a second set of instructions. The apparatus further includes a processor that, upon executing the first set of instructions and the second set of instructions, is configured to, in response to the first transmission queue containing less than the threshold number of data packets, transfer a data packet from the second transmission queue to the first transmission queue, the transferred data packet comprising at least two concatenated data packets, identify the transferred data packet as a ready-to-send data packet in the first transmission queue, and indicate the presence of a subsequent ready-to-send data packet in a primary ready-to-send data packet, the primary ready-to-send data packet and the subsequent ready-to-send data packet existing in a sequence of ready-to-send data packets in the first transmission queue.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The subject invention will be described within the context of a modem utilizing a model 3350 DOCSIS cable modem IC, manufactured by Broadcom, Inc. of Irvine, Calif. However, it will be appreciated by those skilled in the art that the subject invention may be equally implemented by cable modems utilizing other cable modem ICs and the like. Furthermore, the principles of the subject invention can be applied to other bi-directional communication devices other than cable modems for upstream communication. Advantageously, the subject invention provides a method and apparatus for combining the concatenation and piggybacking of data packets in bi-directional communication systems to thereby reduce processing time and increase the rate of data transmission.

Figure 1:
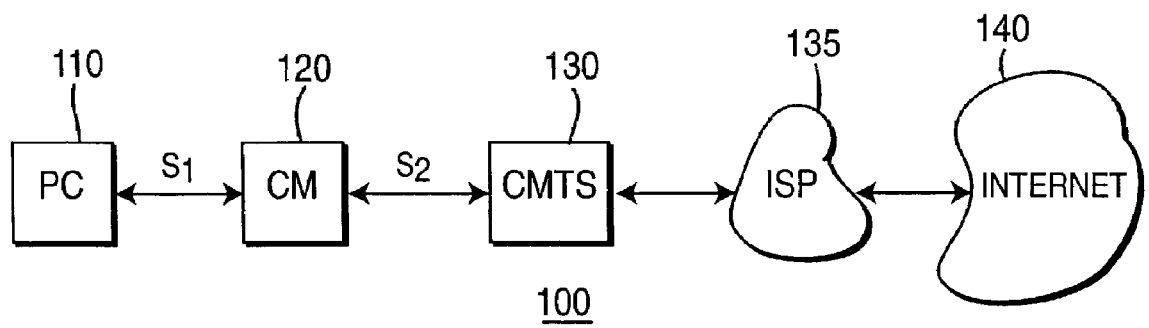
FIG. 1 depicts a high-level block diagram of a bi-directional communications system including an embodiment of the present invention.

FIG. 1 depicts a high-level block diagram of a bi-directional communications system including an embodiment of the present invention. The bi-directional communications system 100 of FIG. 1 includes a personal computer (PC) 110, a cable modem (CM) 120, a Cable Modem Termination System (CMTS) 130 connected to an access network such as an Internet Service Provider (ISP) 135, and a network such as an Internet 140. The cable modem (CM) 120 allows a PC user high-speed access to the Internet 140 as shown in FIG. 1. The CM 120 receives data packets from the PC 110 or other customer premises equipment (CPE) for subsequent transmission to the CMTS 130. The CM 120 is comprised in part of a cable modem IC (illustratively a Broadcom 3350 DOCSIS single chip cable modem IC) and cable modem application software specific to that IC. The Broadcom 3350 DOCSIS single chip cable modem IC contains a packet descriptor queue and software (not shown), and operates in conjunction with the cable modem application software to enable bi-directional communication.

The CMTS 130 controls the flow of information to the CM 120, which is called downstream transmission, and from the CM 120 to the CMTS 130, which is called upstream transmission. The CMTS 130 sends its packets to an Internet service provider (ISP) network which then forwards them to the Internet 140. Although the bi-directional communications system 100 of FIG. 1 is depicted as communications system between a PC and the Internet, it will be appreciated by those skilled in the art that the subject invention can be advantageously implemented in other bi-directional communications systems including the communication between multiple PCs or other CPEs to the Internet or other IP or data packet networks.

In the bi-directional communications system 100 of FIG. 1, the bandwidth available in the upstream direction is typically less than the bandwidth available in the downstream direction. In order to use the available upstream bandwidth more efficiently, and in accordance with an embodiment of the present invention, the CM 120 incorporates in a novel configuration the combination of concatenation and piggybacking into upstream transmissions. The individual concatenation and piggybacking methods of the present invention may be practiced with existing communication software and hardware, as will be evident to one skilled in the art and will not be described in detail herein. However, the method and apparatus of the subject invention for combining the concatenation and piggybacking methods to reduce the processing time and increase the rate of data transmission in bi-directional communications systems is not known and will be described in detail herein.

Figure 2:
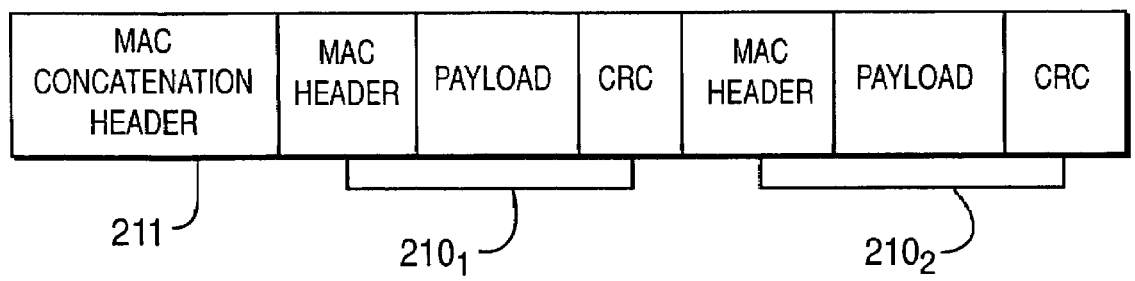
FIG. 2 depicts a block diagram of a concatenated data packet.

FIG. 2 illustrates a concatenated data packet. The concatenated data packet 200 of FIG. 2 is comprised of two individual data packets $210_1$ and $210_2$ at the media access control (MAC) layer, which are grouped together. A concatenation header 211 is added to the concatenated data packet 200 for storing information to be used later for decompression or extraction of the concatenated data packet. Various methods of concatenation are described in, for example, the DOCSIS 1.0/1.1 RFI specification.

In one embodiment, in order to implement concatenation, a number of individual data packets received by a cable modem from LAN-side (or CPE) equipment for upstream transmission are combined into a single data packet with the appropriate data packet header. Concatenation is implemented by waiting until a requisite number of data packets to be transmitted upstream to the CMTS are queued at the cable modem. Once the requisite number of data packets is attained, data packets are concatenated, a header is attached, and the concatenated data packet is transmitted upstream to a CMTS. If the data packets were sent individually, separate requests would be used to send each of the data packets. Only a single request needs to be sent for a concatenated data packet.

Figure 3:
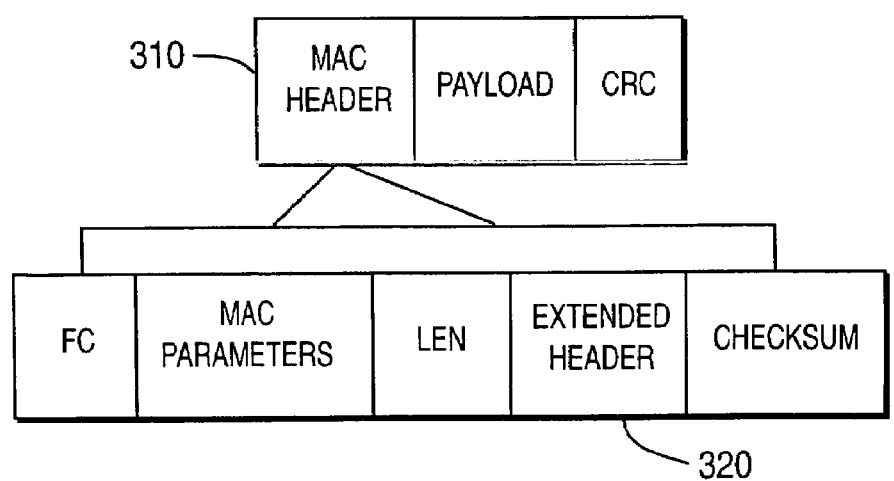
FIG. 3 depicts a block diagram of a typical media access control header.

FIG. 3 illustrates a typical data packet 300 as seen at the MAC layer. Each data packet has a MAC header 310 which in turn is made up of a number of fields; one of which is an extended header field 320. A number of implementations for extended headers have been defined in the DOCSIS RFI 1.0/1.1 specifications. The DOCSIS RFI 1.0/1.1 defines a number of extended header fields which allow a request to be made if another data packet is ready to be sent (in addition to the one that is currently being sent). The process of requesting bandwidth for the next data packet in the extended header of the data packet currently being sent is called a Piggyback Request. This method allows multiple data packets to be sent with only a single initial request (subsequent requests are piggyback).

Figure 4:
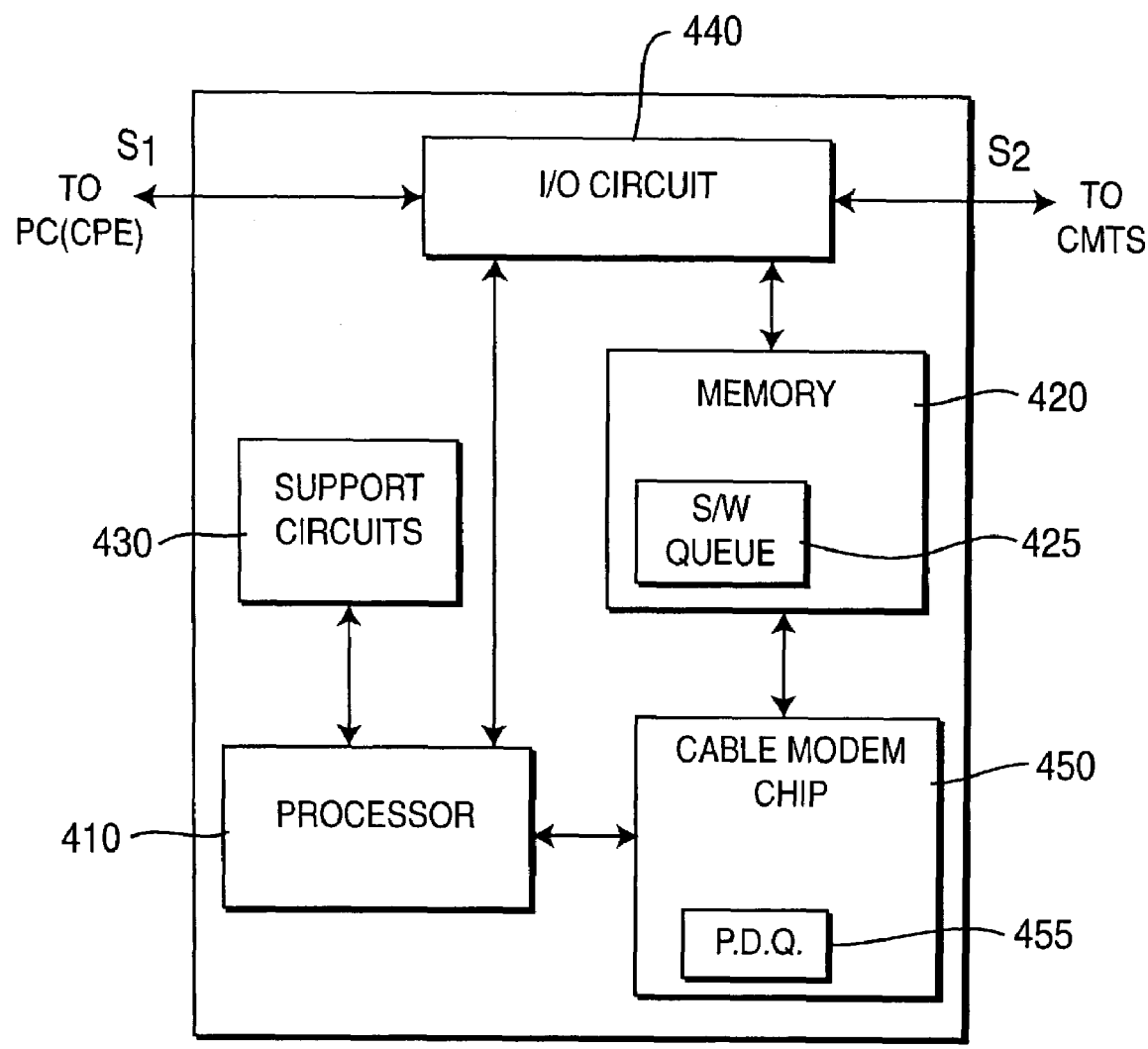
FIG. 4 depicts a high-level block diagram of one embodiment of a cable modem suitable for use in the communication system of FIG. 1.

FIG. 4 depicts a high-level block diagram of one embodiment of a cable modem 120 suitable for use in the communications system 100 of FIG. 1. The cable modem 120 of FIG. 4 comprises a processor 410 as well as a memory 420. The memory 420 is utilized for storing information and application software routines, etc. The memory 420 also comprises a software queue 425. The processor 410 cooperates with conventional support circuitry 430 such as power supplies, clock circuits, cache memory and the like as well as circuits that assist in executing the software routines stored in the memory 420. In alternate embodiments, the processor 410 is integrated into the cable modem IC to save money and printed circuit board space. As such, it is contemplated that some of the process steps discussed herein as software processes may be implemented within hardware, for example, as circuitry that cooperates with the processor 410 to perform various steps. The cable modem 120 also contains input-output circuitry 440 that form an interface between the various functional elements communicating with the cable modem 120. For example, in the embodiment of FIG. 1, the cable modem 120 communicates with the PC 110 via signal path S1 and the Internet 140 via signal path S2. The cable modem 120 also contains a cable modem IC (illustratively a Broadcom 3350 DOCSIS single chip cable modem IC) 450. The cable modem IC 450 operates in conjunction with stored software routines to enable bi-directional communication. The cable modem IC 450 comprises a packet descriptor (PD) queue 455.

Although the cable modem 120 of FIG. 4 is depicted substantially as a general purpose computer that is programmed to perform various control functions in accordance with the present invention, the functions can be implemented in hardware, for example, as an application specified integrated circuit (ASIC). As such, the process steps described herein are intended to be broadly interpreted as being equivalently performed by software, hardware, or a combination thereof.

Referring to FIGS. 1-4, in one embodiment a maximum number of data packets (illustratively 3 data packets either single or concatenated) are placed into a sequence of data packets in the packet descriptor queue 455 of the cable modem IC 450, with their ownership bits set to one (ready-to-send). Any additional data packets (over 3) which have been received, or which are received before the first of the three data packets in the PD queue 455 are transmitted upstream to the CMTS 130, are placed into the software queue 425. Although the maximum number of packets in the PD queue 455 of the cable modem IC 450 is depicted above as three (3), it will be appreciated by those skilled in the art that the maximum number of data packets can be any number greater than two (2).

Prior to the CM 120 sending an initial request for bandwidth for a primary data packet (first data packet) to the CMTS 130, the CM 120 determines whether a predetermined maximum number of ready-to-send data packets exist in the PD queue 455. If the predetermined maximum number of ready-to-send data packets does not exist in the PD queue 455, the software queue 425 is checked for data packets.

If a single data packet is available in the software queue 425, then that packet is placed into the PD queue 455 with its ownership bit set to increase the total number of ready-to-send data packets in the PD queue. If a plurality of data packets are available at the software queue 425, they are combined into a concatenated data packet 200 (the number which can be combined is based on rate limiting considerations and available space in the data packet descriptor queue) and placed into the PD queue 455 with their ownership bits set. In the Broadcom 3350 IC, concatenation occurs through software interaction when concatenation is enabled thereon.

The process of transferring data packets from the software queue 425 to the PD queue 455 continues until the PD queue obtains the predetermined maximum number of ready-to-send data packets or until the software queue 425 no longer has any data packets. If there are no data packets in the software queue 425 and there are less than two data packets in the PD queue 455, then the entire process is held in abeyance because data packets can no longer be piggybacked or concatenated, in accordance with the principles of the present invention.

In an alternate embodiment, the process of transferring data packets from the software queue 425 to the PD queue 455 stops when there are at least two ready-to-send data packets in the PD queue 455. That is, contrary to the method described above (where the method continues until the PD queue 455 obtains the maximum number of ready-to-send data packets), if there are two ready-to-send data packets in the PD queue 45, then no more data packets are transferred from the software queue 425 to the PD queue 455. Two is the minimum number of data packets that is needed to be in the PD queue 455 for the method of piggybacking and concatenating of the present invention to be performed.

After the process of transferring data packets is exited, a request is then sent to the CMTS 130 for enough mini-slots to send the first data packet. When the request is received by the CMTS 130, the CMTS 130 evaluates the received request and sends the appropriate grant back to the CM 120.

Upon receiving a grant for the first data packet, the CM 120 prepares to send the first data packet to the CMTS 130. Prior to sending the first data packet to the CMTS 130, an indication of a subsequent data packet is inserted into an extended header 320 of the first data packet. The indication of the subsequent packet inserted into the extended header 320 of the first data packet includes an indication of the number of mini-slots (bandwidth portion required to send a packet) required to send the subsequent data packet (second data packet). The indication in the first data packet of the number of mini-slots required for the subsequent data packet acts as the piggyback request for the second packet to be transmitted to the CMTS 130. When the CMTS 130 receives the first sent data packet, the CMTS 130 recognizes the piggyback request (if present) in the extended header 320 of the first sent data packet and issues a new grant for the subsequent data packet. As such, the need for a separate request for a subsequent data packet in the PD queue 455 of the CM 120 is alleviated. In the Broadcom 3350 IC, Piggyback Requests are automatically generated when the feature is enabled and there is at least one other data packet ready to be sent upstream in addition to the one currently being processed.

After the grant for the subsequent data packet is received by the CM 120, the CM then returns to determining whether a predetermined maximum number of ready-to-send data packets exist in the PD queue 455. As before, if the predetermined maximum number of ready-to-send data packets does not exist in the PD queue 455, the software queue 425 is checked for data packets and the transferring process is repeated. Also as previously described, prior to the transmission of the second data packet to the CMTS 130, the CM 120 evaluates the PD queue 455 for any additional data packets with their ownership bits set to one (ready to be transmitted). If any such data packets do exist, a request for minislots is placed in the extended header 320 of the second data packet, indicating the size of the subsequent data packet (third data packet) waiting to be transmitted. The entire process continues until there are no data packets left in the software queue 425 and the number of ready-to-send data packets in the PD queue 455 is not greater than one.

Figure 5:
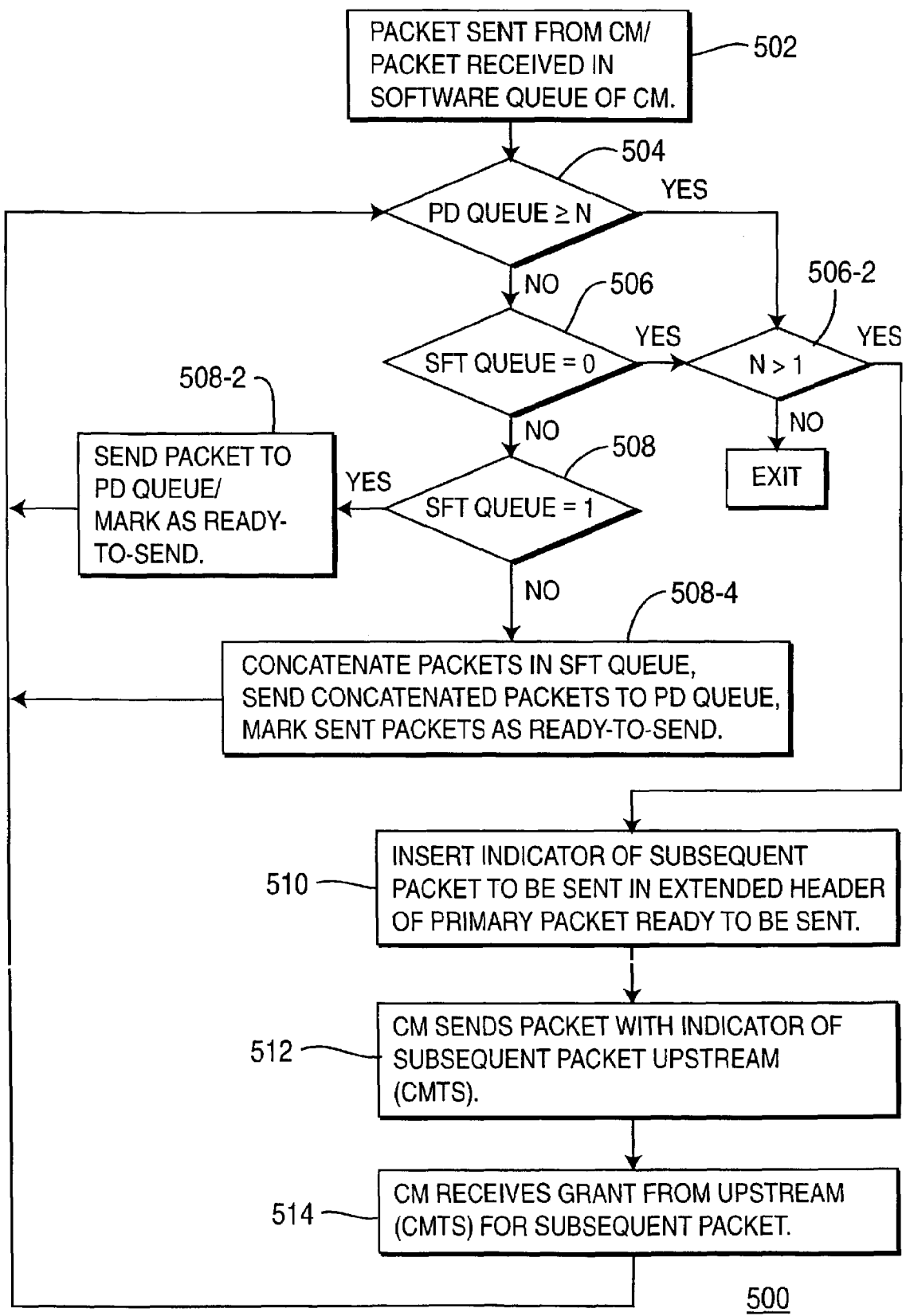
FIG. 5 depicts a flow diagram of a method for the concatenation and piggybacking of data packets in bi-directional communication systems in accordance with the present invention.

FIG. 5 depicts a flow diagram of one embodiment of a method 500 for combining concatenation and piggybacking methods to reduce the processing time and increase the rate of data transmission in bi-directional communications systems. Although the method 500 will be described within the context of a modem utilizing a Broadcom 3350 DOCSIS cable modem IC, it will be appreciated by those skilled in the art that the subject invention may be equally implemented by cable modems utilizing other cable modem ICs. Furthermore, the principles of the subject invention can be applied to other bi-directional communication devices for upstream communication other than cable modems.

The method 500 is entered at step 502 when a data packet is sent from a packet descriptor queue of a CM, or alternatively when a data packet is received in a software queue of the CM.

At step 504 the method 500 determines how many data packets are ready to be sent from the packet descriptor queue of the CM to a CMTS. Assuming that the packet descriptor queue of the CM is configured to queue up N (a predetermined number) data packets before allowing transmission of data packets to the CMTS, if the number of ready-to-send data packets in the packet descriptor queue is greater than or equal to N, the method advances to step 506-2; if the number of ready-to-send data packets in the data packet descriptor queue is less than N, the method proceeds to step 506.

At step 506 the method 500 determines if there are any data packets in the software queue of the CM. If there are no data packets in the software queue of the CM, the method advances to step 506-2. If there are data packets in the software queue of the CM, the method 500 proceeds to step 508.

At step 506-2 the method 500 verifies that more than 1 ready-to-send data packets exist in the packet descriptor queue of the CM. If there is more than 1 ready-to-send data packet in the packet descriptor queue, the method proceeds to step 510; if there is not more than one ready-to-send data packet in the PD queue, the method 500 is exited (at which time the process may begin again at step 502). If there is not more than one ready-to-send data packet in the packet descriptor queue the method 500 is exited because the piggybacking portion of the present invention could not be implemented and the lone, ready-to-send data packet would be sent to the CMTS via conventional methods.

At step 508 the method 500 determines how many data packets are in the software queue of the CM. If only a single data packet is present in the software queue of the CM, the method proceeds to step 508-2; if however, multiple data packets are present in the software queue of the CM, the method proceeds to step 508-4.

At step 508-2 the data packet is removed from the software queue and forwarded to the packet descriptor queue and is marked as ready to be sent (ready-to-send packet) to the CMTS. The method then returns to step 504.

At step 508-4 the data packets are combined into a concatenated data packet (with a concatenation header), removed from the software queue and forwarded to the packet descriptor queue and marked as ready to be sent to the CMTS. It should be noted that if the number of available data packets in the software queue of the CM exceeds the number of data packets that can be concatenated into a single data packet, then the largest possible concatenated data packet is created from the available data packets in sequence, and the rest of the available data packets are left in the software queue of the CM. The number of data packets that can be concatenated is based on rate limiting considerations and available space in the data packet descriptor queue. The method then returns to step 504.

In the embodiment of the method 500 described above, the method 500 returns to step 504 after completing steps 508-2 or 508-4. One purpose for returning to step 504 is to attempt to fill the PD queue with N data packets (maximum number of data packets) before proceeding to step 510. It will be appreciated by one skilled in the art that the present invention can be configured to return to step 506-2 after steps 508-2 or 508-4 and still be within the scope of the present invention. In the alternate embodiment in which the method returns to step 506-2, the method continues without the PD queue having the maximum number of ready-to-send data packets. That is, as long as there are at least two data packets in the packet descriptor queue of the CM, the method can proceed and perform the piggybacking portion of the method.

At step 510 an indicator of a subsequent ready-to-send data packet is inserted into an extended header of the primary ready-to-send data packet in the packet descriptor queue of the CM. That is, prior to a data packet being transmitted from the CM to the CMTS, a search is performed to identify a subsequent ready-to-send data packet in the packet descriptor queue of the CM. If a subsequent ready-to-send data packet exists, an indication of the data packet is inserted into the extended header of the primary ready-to-send data packet (first ready-to-send data packet) in the packet descriptor queue of the CM to generate a Grant from the CMTS for the subsequent ready-to-send data packet. The indicator inserted into the extended header of the primary ready-to-send data packet identifies the number of mini-slots needed to accommodate the data packet.

At step 512 the primary ready-to-send data packet containing the indicator of the subsequent ready-to-send data packet is transmitted from the CM to the CMTS.

At step 514 the CM receives a Grant from the CMTS for the subsequent ready-to-send data packet after the CMTS evaluates the primary ready-to-send data packet sent from the CM and identifies the presence of the subsequent ready-to-send data packet. The method 500 then returns to step 504. The method 500 is exited when there are not at least two ready-to-send data packets in the packet descriptor queue of the CM and there are no data packets to transfer from the software queue of the CM to the packet descriptor queue.

While the forgoing is directed to some embodiments of the present invention, other and further embodiments of the invention may be devised without departing from the basic scope thereof. As such, the appropriate scope of the invention is to be determined according to the claims, which follow.

What is claimed is:

1. A method, comprising:
   in response to a first transmission queue of a bi-directional communication device containing less than a threshold number of data packets, performing the steps of:
   transferring a data packet from a second transmission queue in said bi-directional communication device to said first transmission queue, said transferred data packet comprising at least two concatenated data packets;
   identifying said transferred data packet as a ready-to-send data packet in said first transmission queue; and
   indicating the presence of a subsequent ready-to-send data packet in a primary ready-to-send data packet, said primary ready-to-send data packet and said subsequent ready-to-send data packet existing in a sequence of ready-to-send data packets in said first transmission queue.

2. The method of claim 1, wherein the indication of the presence of the subsequent ready-to-send data packet is inserted into a header of said primary ready-to-send data packet.

3. The method of claim 1, wherein said indicating is performed prior to transmitting the primary ready-to-send data packet upstream.

4. The method of claim 1, further comprising:
   transmitting said primary ready-to-send data packet upstream toward a control device, the control device for identifying the indication of the presence of the subsequent ready-to-send data packet in the primary ready-to-send data packet; and
   receiving a grant for bandwidth for at least the subsequent ready-to-send data packet.

5. The method of claim 1, wherein said transferring step is repeated until the number of ready-to-send data packets in said first transmission queue is equal to said threshold number.

6. The method of claim 1, further comprising:
   verifying that at least two ready-to-send data packets exist in said first transmission queue prior to said indicating step.

7. The method of claim 1, wherein said ready-to-send data packets are data packets having respective ownership bits set to a first state.

8. The method of claim 1, wherein said bi-directional communication device is a cable modem.

9. The method of claim 8, wherein said cable modem comprises a cable modem IC.

10. The method of claim 9, wherein said cable modem IC is a Broadcom 3350 DOCSIS cable modem IC.

11. The method of claim 10, wherein said first transmission queue is a packet descriptor queue in said Broadcom 3350 DOCSIS cable modem IC.

12. The method of claim 8, wherein said second transmission queue is a software queue in said cable modem.

13. An apparatus, comprising:
- a first transmission queue, for storing data packets and a first set of instructions;
- a second transmission queue for storing data packets over a predetermined threshold number of data packets to be stored in said first transmission queue and a second set of instructions; and
- a processor, upon executing said first set of instructions and said second set of instructions, for performing the following steps in response to a first transmission queue containing less than the threshold number of data packets:
  - transfer a data packet from said second transmission queue to said first transmission queue, said transferred data packet comprising at least two concatenated data packets;
  - identify said transferred data packet as a ready-to-send data packet in said first transmission queue; and
  - indicate the presence of a subsequent ready-to-send data packet in a primary ready-to-send data packet, said primary ready-to-send data packet and said subsequent ready-to-send data packet existing in a sequence of ready-to-send data packets in said first transmission queue.

14. The apparatus of claim 13, wherein the indication of the presence of the subsequent ready-to-send data packet is inserted into a header of said primary ready-to-send data packet.

15. The apparatus of claim 13, wherein said bi-directional communication device is a cable modem.

16. The apparatus of claim 15, wherein said cable modem comprises a cable modem IC.

17. The apparatus of claim 16, wherein said cable modem IC is a Broadcom 3350 DOCSIS cable modem IC.

18. The apparatus of claim 17, wherein said first transmission queue is a packet descriptor queue in said Broadcom 3350 DOCSIS cable modem IC.

19. The apparatus of claim 15, wherein said second transmission queue is a software queue in said cable modem.

\* \* \* \* \*